May 9, 1961 L. H. LEONARD, JR 2,983,110
ABSORPTION REFRIGERATION SYSTEMS
Filed March 12, 1956 2 Sheets-Sheet 1

INVENTOR.
LOUIS H. LEONARD, JR.
BY
Herman Seid
ATTORNEY.

May 9, 1961 L. H. LEONARD, JR 2,983,110
ABSORPTION REFRIGERATION SYSTEMS
Filed March 12, 1956 2 Sheets-Sheet 2

INVENTOR.
LOUIS H. LEONARD, JR.
BY
*Herman Seid*
ATTORNEY.

United States Patent Office 2,983,110
Patented May 9, 1961

2,983,110

ABSORPTION REFRIGERATION SYSTEMS

Louis H. Leonard, Jr., East Syracuse, N.Y., assignor to Carrier Corporation, Syracuse, N.Y., a corporation of Delaware Filed Mar. 12, 1956, Ser. No. 570,952

17 Claims. (Cl. 62—101)

This invention relates to absorption refrigeration systems and, more particularly, to an absorption refrigeration system employing water as a refrigerant and a solution of lithium bromide and water as an absorbent. The present invention is concerned particularly with absorption refrigeration systems of the type known as internal coil machines in which a medium to be cooled is passed through a heat exchange member placed in the evaporator of the absorption refrigeration system and is cooled by the vaporization or evaporation of refrigerant placed in heat exchange relation therewith.

The chief object of the present invention is to provide an improved absorption refrigeration system of the internal coil type.

An object of the invention is to provide an absorption refrigeration system in which strong solution from the generator is placed in heat exchange relation with excess refrigerant in the evaporator to cool a medium passing through the heat exchange member in the evaporator.

A further object is to provide an absorption refrigeration system in which strong solution returning from the generator is sprayed in heat exchange relation with refrigerant in the evaporator thereby boiling the refrigerant in the evaporator to wet at least bottom portions of a heat exchange member therein, the liquid refrigerant thrown or exploded in heat exchange relation with medium passing through the heat exchange member absorbing heat from the medium and changing its state to vapor, the vapor traveling upward carrying other droplets of liquid refrigerant thereby wetting remaining portions of the heat exchange member. Other objects of the invention will be readily perceived from the following description.

This invention relates to an absorption refrigeration system which includes, a generator, a condenser, an absorber and an evaporater placed in a closed circuit. Means are provided for forwarding weak solution from the absorber to the generator, and for forwarding strong solution from the generator to the absorber. Suitable control means are provided for regulating operation of the system. Vapor boiled off in the generator passes to the condenser and is condensed therein. Means are provided for supplying condensate from the condenser to the evaporator, the condensate flash-cooling upon discharge in the evaporator. Means are provided for placing the remaining or stored liquid refrigerant in heat exchange relation with strong solution to heat the refrigerant thus exploding or throwing violently droplets of refrigerant upward and creating vapor. It will be appreciated the droplets wet portions of the heat exchange member and are vaporized by the heat exchange relation with medium passing through the member thus cooling the medium by the absorption of heat therefrom and changing the state of the refrigerant from a liquid to a gas or vapor. The vapor carries some droplets to wet further portions of the heat exchange member, the droplets being placed in heat exchange relation with medium being cooled and vaporized thus removing heat from the medium.

The attached drawings illustrate a preferred embodiment of the invention, in which.

Figure 1:
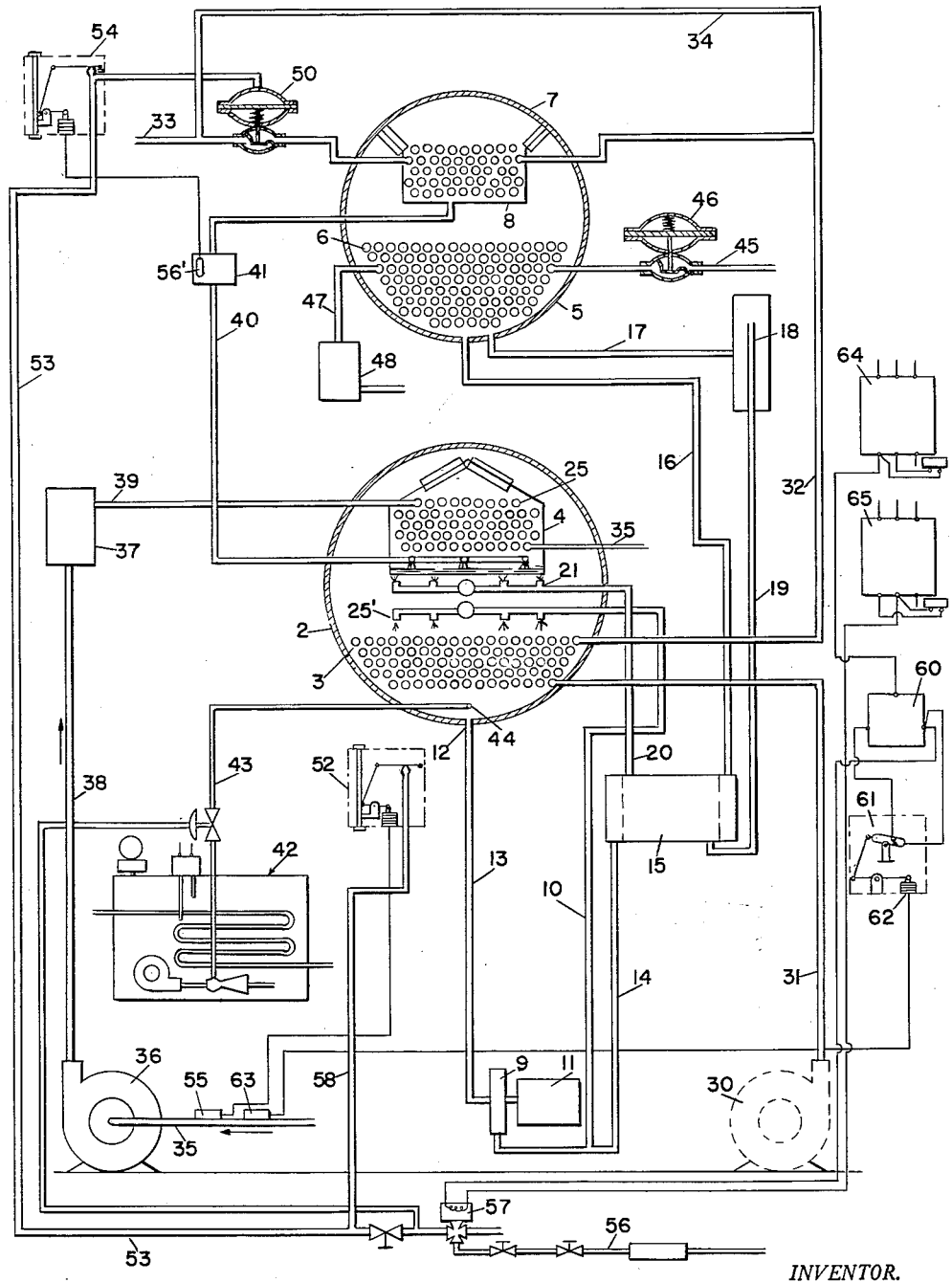
Figure 1 is a diagrammatic view illustrating the absorption refrigeration system of the present invention.

Referring to the attached drawings, there is illustrated diagrammatically in Figure 1 an absorption refrigeration system including the present invention. The system comprises a shell 2 containing a plurality of tubes 3 which cooperate with the shell to form an absorber. Placed in shell 2 above absorber 3 is a pan-like receptacle 4 which cooperates with the shell 2 to form an evaporator. A second shell 5 preferably, is placed above the first shell. Tubes 6 extend in the lower portion of shell 5 and cooperate with shell 5 to form a generator. A plurality of tubes 7 are placed in the upper portion of shell 5 to form a condenser. Tubes 7 cooperate with a pan 8 to form the condenser.

A pump 9 is provided to supply weak solution from the absorber to the generator and to recirculate solution in the absorber. As hereinafter described, pump 9 may be driven by a motor 11.

Pump 9 withdraws weak solution from absorber 3 through outlet or sump 12 and line 13. Pump 9 forwards the weak solution through line 14, heat exchanger 15 and line 16 to generator 6. Pump 9 also forwards solution through line 14 and line 10 to spray arrangement 25' which sprays solution over the tubes of the absorber. This assures that the tubes are thoroughly wet during operation. Strong solution is withdrawn from generator 6 through line 17, an overflow arrangement 18 which maintains a desired level of solution in generator 6 and is returned to the absorber through line 19, heat exchanger 15, line 20 and spray arrangement 21. In the present invention it is essential that the strong solution returning from the generator by forces of gravity be sprayed against the exterior side of the receptacle 4 in heat exchange relation with excess refrigerant stored therein.

Pump 30 supplies condensing water through line 31 to the tubes 3 of the absorber. The condensing water, after passage through tubes 3, passes through line 32 to the tubes 7 of the condenser. The condensing water after passage through the tubes of the condenser is discharged to a cooling tower or drain through line 33. Preferably, a by-pass line 34 is provided about the tubes 7 of the condenser extending from line 32 to line 33.

A heat exchange member 25 is placed in evaporator 4, medium to be cooled passing through member 25. Pump 36 withdraws cooled medium from the heat exchange member 25 through line 35. The cooled medium is forwarded to a place of use which may be the central station 37 of an air conditioning system through line 38. Medium after passing through the place of use returns to the heat exchange member 25 through line 39 to be again cooled.

Figure 2:
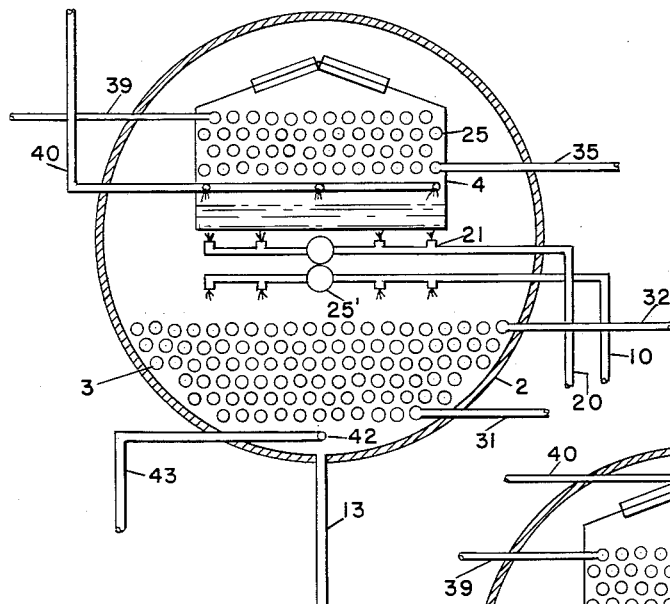
Figure 2 is a sectional view through the absorber-evaporator shell of Figure 1 illustrating the manner in which the stored refrigerant and strong solution are placed in heat exchange relation within the shell.

Condensate leaves condenser 7 through line 40 and is returned to the evaporator being flash-cooled in the evaporator, flashed vapor passing upward while the cooled liquid refrigerant (excess refrigerant) is stored in the bottom of the receptacle. Preferably, as shown in Figures 1 and 2, the condensate is discharged in the evaporator adjacent the bottom of the receptacle 4 for a purpose hereinafter explained. A bottle or similar container 41 is placed in line 40 for a purpose hereinafter explained.

A suitable purge arrangement 42 is provided to remove non-condensible gases collected in the absorber. A satisfactory purge arrangement is disclosed and claimed in my co-pending application Serial No. 565,324, filed February 14, 1956. Purge arrangement 42 is connected to the absorber by line 43 which is attached to a purge line 44 extending longitudinally of the absorber. Preferably, line 44 is placed immediately below the tube bundle centrally of the bundle.

Steam is supplied to the tubes 6 of the generator through line 45. The usual pressure regulating valve 46 may be placed in line 45 to assure desired steam pressure in the generator. Valve 46 assures that the pressure of steam passing to the generator is controlled at a predetermined point.

Steam condensate leaves the tubes of generator 6 through line 47, steam trap 48 being provided in line 47 to assure that only condensate leaves the generator.

A normally closed pneumatic valve 50 is placed in line 33 between the tubes 7 of the condenser and the connection of by-pass line 34 and line 33. Valve 50 regulates passage of condensing water through the condenser 7. Valve 50 is actuated as hereinafter described. By-pass 34 assures flow of condensing water is maintained substantially constant while permitting variation in flow of condensing water to the tubes of the condenser 7.

A thermostatic control 52 regulates the pressure of air passing through branch line 53 to a second thermostatic control 54. Thermostatic control 54 in turn regulates the air pressure applied to valve 50. Thermostatic control 52 is actuated by means of a bulb 55 placed adjacent chilled medium line 35. Bulk 55 reflects the temperature of cooled medium which in turn indicates the load imposed upon the system. Control 54 is actuated by bulb 56' placed in container 41 which reflects saturation temperature corresponding to pressure in shell 5. Air pressure is supplied to the controls through main air line 56, a solenoid valve 57 or relay of suitable design being placed therein as a safety control. Air pressure passes through line 56 to branch line 53. Thermostat 52 is connected to line 53 by branch line 58. Thus, pressure in branch line 53 may be regulated by thermostat 52 venting a portion of air therein to the atmosphere in accordance with the temperature of cooled medium reflecting the load imposed upon the system. Thermostat 54 has air pressure applied thereto through line 53 and vents air to the atmosphere as determined by the saturation temperature corresponding to pressure in shell 5 reflected by bulb 56'. Thermostat 54 regulates the air pressure applied to the diaphragm of valve 50.

A rotary switch 60 is provided and connected to a mercury switch 61. Mercury switch 61 may be actuated by means of a bellows 62 and bulb 63 placed adjacent cooled medium line 35. Mercury switch 61 serves in effect as a safety control. The starters 64, 65, actuate the motor 11 of pump 9 and the motor (not shown) of cooled medium pump 36. A starter for condensing water pump 30 is not shown since such pump and motor are generally provided by the installer.

The control arrangement herein shown is described and claimed in my Patent No. 2,722,805, issued November 8, 1955, entitled Control Arrangement for Absorption Refrigeration Systems. Reference is made to such application for a full description of the control arrangement and the manner in which it operates.

The term "weak solution" is used herein to describe a solution weak in absorbing power. The term "strong solution" is used herein to define a solution strong in absorbing power.

The preferred absorbing solution is a solution of lithium bromide and water. The preferred refrigerant is water. With such solution the maximum allowable solution concentration leaving the generator is 66%. A greater concentration may permit crystallization to occur causing solidification of the heat exchanger and perhaps in other portions of the system.

Considering operation of the system, cooled medium is withdrawn from heat exchange member 25 of the evaporator through line 35 by pump 36 and is circulated through line 38 to a place of use, medium returning to heat exchange member 25 through line 39.

Pump 9 is actuated to withdraw weak solution from absorber 3 through outlet 12 and line 13, forwarding the weak solution through line 14, heat exchanger 15 and line 16 to the generator. Pump 9 also serves to recirculate solution in the absorber forwarding weak solution through line 10 to spray arrangement 25' in the absorber which discharges the solution over the tubes of the absorber thus assuring thorough wetting of the tubes.

Refrigerant vapor is boiled off the solution in generator 6. Strong solution passes from the generator to the absorber through line 17, overflow arrangement 18, line 19, heat exchanger 15 and line 20, the strong solution being discharged in absorber 3 by spray arrangement 21 against the bottom surfaces of receptacle 4 of the evaporator in heat exchange relation with excess or stored refrigerant therein. Discharged strong solution after its passage in heat exchange relation wtih stored refrigerant in the evaporator mixes with solution in the absorber and is again withdrawn from the absorber through outlet 12 by pump 9.

Refrigerant vapor boiled off from the solution in generator 6 passes upward to condenser 7 where it is condensed. The vapor condensate returns to evaporator 4 through line 40, being discharged in the evaporator, preferably, adjacent the interior of the base of receptacle 4. It will be appreciated the vapor condensate flash-cools upon discharge in the evaporator, the vapor passing upward through the heat exchange member and downward about the exterior of pan 4 to the absorber where it is absorbed by solution. The liquid refrigerant collects or is stored in the bottom of receptacle 4.

The stored refrigerant in the evaporator described above is placed in heat exchange relation with strong solution returning to the absorber from the generator which is discharged against the exterior surface of the receptacle. Thus, the heat exchange relation between stored refrigerant and strong solution in the absorber-evaporator shell heats the refrigerant violently or explosively throwing or exploding droplets of refrigerant upward and wetting at least the lower portions of heat exchange member 25, the droplets absorbing heat from the medium passing through the member by change in state and vaporizing, the vapor passing upward through remaining portions of the member and downward about the receptacle to the absorber. The heat exchange relation with the strong solution, of course, creates vapor which passes upward through the heat exchange member carrying droplets of liquid refrigerant which serve to wet remaining portions of the member thus being placed in heat exchange relation with the medium being cooled. In other words, the explosive effect created by the heat exchange relation of the strong solution and stored refrigerant wets at least a portion of heat exchange member 25 while vapor carries other droplets of refrigerant upward to wet the remaining portions of heat exchanger 25 to remove heat from the medium passing therethrough. The medium, of course, is cooled by the removal of heat therefrom by the liquid refrigerant droplets thus vaporizing or evaporating the droplets.

Figure 3:
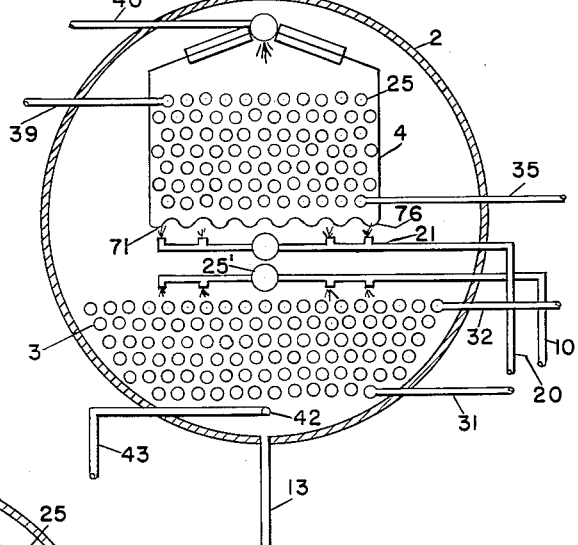
Figure 3 is a sectional view similar to Figure 2 illustrating vapor condensate being discharged over the heat exchange member in the evaporator.

In Figure 3 I have illustrated a modification of the invention. In this case receptacle 4 is provided with a bottom surface 71 having corrugations 76 therein. The corrugations provide irregularities which permit drops of solution to form uniformly over the bottom of the receptacle and vapor bubbles to form effectively in the interior of the receptacle. The corrugations prevent channeling of strong solution during operation of the system. That is, the corrugations prevent strong solution after discharge against the exterior surface of the receptacle from running along the surface and dropping from the surface at one or just a few places thus assuring adequate distribution of the strong solution over the exterior surface of the receptacle.

In Figure 3 it will be observed that vapor condensate returning to the evaporator through line 40 is discharged over heat exchange member 25 thus aiding in cooling medium passing therethrough. In other respects, operation of the system is similar to the operation of the system described in Figures 1 and 2.

Figure 4:
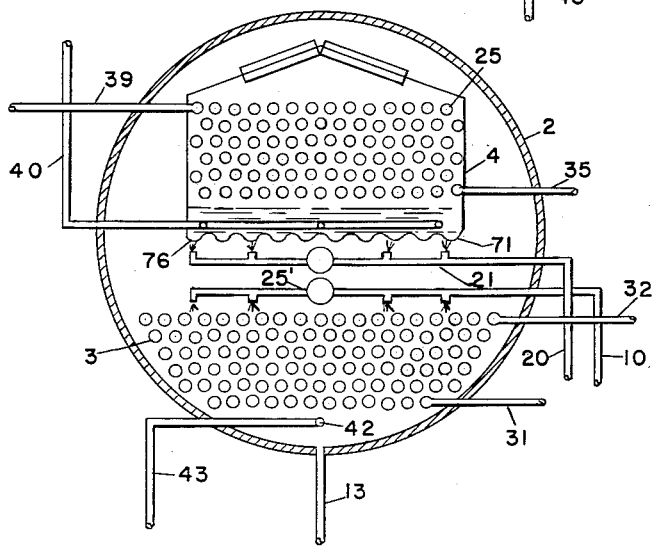
Figure 4 is a sectional view illustrating vapor condensate being discharge in the evaporator below the liquid level of stored refrigerant therein.

In Figure 4 a further modification is disclosed. In this case vapor refrigerant is discharged in the evaporator below the level of stored refrigerant therein thus assisting in creating a violent explosive action to throw or explode droplets of liquid refrigerant over the heat exchange member 25 to wet the same. As shown in Figure 4, corrugations 76 may be provided in the bottom surface 71.

The present invention provides an absorption refrigeration system of the internal coil type which is efficient in operation and simple in installation. In the system of the present invention strong solution and stored liquid refrigerant are placed in heat exchange relation in the absorber-evaporator shell, thus insuring wetting of the heat exchange member to cool medium passing therethrough. It will be appreciated the heat input or steam consumption of the system may be increased slightly, but this is not important, such increase is roughly equivalent to the power required to drive the recirculating pump and systems heretofore employed or, in other words, eliminates the electrical requirements for such members. The present invention eliminates the pump and motor and connecting piping heretofore required to circulate condensate in the evaporator to cool medium passing therethrough, thus reducing considerably the initial cost of the system with minimum sacrifice of efficiency.

While I have described certain preferred embodiments of the invention it will be understood the invention is not limited thereto since it may be otherwise embodied within the scope of the following claims.

I claim:

1. In an absorption refrigeration system, the combination of a generator, a condenser, an absorber, and an evaporator disposed in a closed circuit, means for forwarding weak solution from the absorber to the generator, means for forwarding strong solution from the generator to the absorber, means for regulating operation of the system, vapor boiled off in the generator passing to the condenser and being condensed therein, means for supplying condensate from the condenser to the evaporator, condensate flash-cooling upon discharge in the evaporator, and means for discharging strong solution in the absorber directly against the bottom of the evaporator to heat remaining liquid refrigerant in the evaporator thereby urging the refrigerant in heat exchange relation with medium to be cooled passing through the evaporator.

2. In an absorption refrigeration system, the combination of a generator, a condenser, an absorber, and an evaporator disposed in a closed circuit, means for forwarding weak solution from the absorber to the generator, means for forwarding strong solution from the generator to the absorber, means for regulating operation of the system, vapor boiled off in the generator passing to the condenser and being condensed therein, means for supplying condensate from the condenser to the evaporator, condensate flash-cooling upon discharge in the evaporator and means for discharging strong solution in the absorber directly against the bottom of the evaporator to heat liquid refrigerant in the evaporator thus throwing violently droplets of refrigerant in heat exchange relation with medium to be cooled passing through the evaporator thereby evaporating the droplets by the removal of heat from the medium.

3. In an absorption refrigeration system, the combination of a generator, a condenser, an absorber, and an evaporator disposed in a closed circuit, means for forwarding weak solution from the absorber to the generator, means for forwarding strong solution from the generator to the absorber, means for regulating operation of the system, vapor boiled off in the generator passing to the condenser and being condensed therein, means for supplying condensate from the condenser to the evaporator, condensate flash-cooling upon discharge in the evaporator, means for placing remaining refrigerant in the evaporator in heat exchange relation with strong solution in the absorber to heat the refrigerant thus throwing violently droplets of refrigerant upward and creating vapor, at least some of the droplets being placed in heat exchange relation with medium being cooled in the evaporator while other droplets are carried by the vapor in heat exchange relation with medium being cooled.

4. In an absorption refrigeration system, the combination of a generator, a condenser, an absorber, and an evaporator disposed in a closed circuit, a heat exchange member in the evaporator through which medium to be cooled passes, means for forwarding weak solution from the absorber to the generator, means for forwarding strong solution from the generator to the absorber, means for regulating operation of the system, vapor boiled off in the generator passing to the condenser and being condensed therein, means for supplying condensate from the condenser to the evaporator, and means for placing excess refrigerant in the evaporator and strong solution in the absorber in heat exchange relation to boil the refrigerant to wet at at least partially a portion of said heat exchange member, vapor so formed traveling upward to carry droplets of refrigerant in heat exchange relation with medium passing through the heat exchange member to cool the medium.

5. In an absorption refrigeration system, the combination of a generator, a condenser, an absorber, and an evaporator disposed in a closed circuit, a heat exchange member in said evaporator through which medium to be cooled passes, a heat transmitting member placed below said heat exchange member, means for forwarding weak solution from the absorber to the generator, means for forwarding strong solution from the generator to the absorber, means for regulating operation of the system, vapor boiled off in the generator passing to the condenser and being condensed therein, means for supplying condensed refrigerant from the condenser to the evaporator, means for discharging refrigerant in the evaporator adjacent one side of the heat transmitting member, means for discharging strong solution against the opposite side of the heat transmitting member to place the refrigerant and strong solution in heat exchange relation to boil the refrigerant thus throwing violently droplets of refrigerant in heat exchange relation with medium passing through the heat exchange member and creating vapor, at least some droplets of refrigerant being carried by the vapor in heat exchange relation with medium passing through the heat exchange member to cool the medium.

6. In an absorption refrigeration system, the combination of a generator, a condenser, a shell containing an absorber and an evaporator, the evaporator being placed in the shell above the absorber, a heat exchange member in the evaporator through which medium to be cooled passes, a heat transmitting member placed below said heat exchange member, means for forwarding weak solution from the absorber to the generator, means for forwarding strong solution from the generator to the absorber, means for regulating operation of the system, vapor boiled off in the generator passing to the condenser and being condensed therein, means for supplying condensed refrigerant from the condenser to the evaporator, means for discharging refrigerant in the evaporator against one side of the heat transmitting member, means for discharging strong solution against the opposite side of the heat transmitting member to boil the refrigerant throwing violently droplets of refrigerant in heat exchange relation with medium passing through the heat exchange member, vapor so formed traveling upward carrying at least some droplets of refrigerant in heat exchange relation with medium passing through the heat exchange member to cool the same.

7. In an absorption refrigeration system, the combination of a generator, a condenser, a shell containing an absorber and an evaporator, the evaporator being placed in the shell above the absorber, the evaporator including a heat exchange member through which medium to be cooled passes and a tank-like member forming a receptacle for condensate, means for forwarding weak solution from the absorber to the generator, means for forwarding strong solution from the generator to the absorber, means for regulating operation of the system, vapor boiled off in the generator passing to the condenser and being condensed therein, means for supplying condensed refrigerant from the condsenser to the evaporator, means for discharging refrigerant adjacent the bottom of the receptacle, spray members in the absorber for spraying strong solution against the opposite side of the bottom of the receptacle thereby placing excess refrigerant in the receptacle and strong solution discharged against its exterior in heat exchange relation to boil the refrigerant throwing violently droplets of refrigerant upward and creating vapor, at least some of the droplets being placed in heat exchange relation with medium passing through the heat exchange member while other droplets are carried by the evaporator in heat exchange relation with medium passing through the exchange member to cool the same.

8. An absorption refrigeration system according to claim 7 in which the base of the receptacle is corrugated providing areas for drops of strong solution to form exteriorly over the bottom of the receptacle and vapor bubbles of refrigerant to form on the interior of the receptacle.

9. In an absorption refrigeration system, the combination of a generator, a condenser, a shell containing an absorber and an evaporator, the evaporator being placed in the shell above the absorber, a heat exchange member in the evaporator through which medium to be cooled passes, a heat transmitting member placed below said heat exchange member, means for forwarding weak solution from the absorber to the generator, means for forwarding strong solution from the generator to the absorber, means for regulating operation of the system, vapor boiled off in the generator passing to the condenser and being condensed therein, means for supplying condensed refrigerant from the condenser to the evaporator, and means for discharging strong solution and refrigerant against opposite sides of the heat-transmitting member to boil the refrigerant.

10. In the method of operation of an absorption refrigeration system including a generator, condenser, absorber and evaporator containing a heat exchange member through which medium to be cooled passes and a heat-transmitting member, the steps which consist in supplying weak solution from the absorber to the generator, boiling solution in the generator, vapor boiled off in the generator passing to the condenser, condensing vapor in the condenser, supplying strong solution from the generator to the absorber, supplying condensed refrigerant from the condenser to the evaporator, and discharging refrigerant in the evaporator and strong solution against opposite sides of the heat-transmitting member to boil the refrigerant.

11. In the method of operation of an absorption refrigeration system including a generator, a condenser, a shell containing an absorber and an evaporator having a heat exchange member through which medium to be cooled passes, the steps which consist in supplying liquid refrigerant to the evaporator, supplying strong solution to the absorber, and discharging the strong solution directly against the bottom of the evaporator to heat liquid refrigerant in the evaporator thereby urging the refrigerant in heat exchange relation with medium to be cooled passing through the evaporator.

12. In the method of operation of an absorption refrigeration system including a generator, condenser, absorber and evaporator containing a heat exchange member through which medium to be cooled passes and a heat-transmitting member, the steps which consist in supplying weak solution from the absorber to the generator, boiling solution in the generator, vapor boiled off in the generator passing to the condenser, condensing vapor in the condenser, forwarding refrigerant condensate to the evaporator, forwarding strong solution from the generator to the absorber, discharging the strong solution and refrigerant against opposite sides of the heat-transmitting member to boil the refrigerant thereby wetting at least partially a portion of the heat exchange member, vapor so formed traveling upward to carry droplets of refrigerant in heat exchange relation with medium passing through the heat exchange member to cool the medium.

13. In the method of operation of an absorption refrigeration system including a generator, condenser, absorber and evaporator containing a heat exchange member through which medium to be cooled passes, the steps which consist in supplying weak solution from the absorber to the generator, boiling solution in the generator, vapor boiled off in the generator passing to the condenser, condensing vapor in the condenser, forwarding refrigerant condensate to the evaporator, forwarding strong solution from the generator to the absorber, discharging the strong solution and condensed refrigerant in heat exchange relation with one another to boil the refrigerant thus throwing violently droplets of refrigerant in heat exchange relation with medium passing through the heat exchange member, at least some droplets of refrigerant being carried by the vapor in heat exchange relation with medium passing through the heat exchange member to cool the medium.

14. An absorption refrigeration system according to claim 7 in which the condensed refrigerant is discharged over the heat exchange member.

15. An absorption refrigeration system according to claim 7 in which the condensed refrigerant is discharged below the surface of the excess refrigerant in the tank-like member.

16. In an absorption refrigeration system, the combination of a generator, a condenser, a shell containing an absorber and an evaporator, means for forwarding weak solution from the absorber to the generator, means for forwarding strong solution from the generator to the absorber, means for regulating operation of the system, vapor boiled off from the generator passing to the condenser and being condensed therein, means for supplying condensate from the condenser to the evaporator, and means for discharging strong solution in the absorber directly against the bottom of the evaporator to heat liquid refrigerant in the evaporator thereby urging the refrigerant in heat exchange relation with medium to be cooled passing through the evaporator.

17. In the method of operation of an absorption refrigerating system including a generator, a condenser and a shell containing an absorber and an evaporator, the steps which consist in forwarding weak solution from the absorber to the generator, forwarding strong solution from the generator to the absorber, vapor boiled off in the generator passing to the condenser and being condensed therein, supplying condensate from the condenser to the evaporator, and discharging the strong solution directly against the bottom of the evaporator to heat liquid refrigerant in the evaporator.

References Cited in the file of this patent

UNITED STATES PATENTS

| | | |
|---|---|---|
| 1,849,685 | Munters | Mar. 15, 1932 |
| 2,284,691 | Standberg | June 2, 1942 |
| 2,337,439 | Anderson | Dec. 21, 1943 |
| 2,408,480 | Reid | Oct. 1, 1946 |
| 2,430,047 | Edberg | Nov. 4, 1947 |
| 2,654,229 | Shagaloff | Oct. 6, 1953 |
| 2,685,782 | Anderson | Aug. 10, 1954 |
| 2,847,832 | Johnson | Aug. 19, 1958 |